United States Patent [19]

Whiteley

[11] 4,123,993
[45] Nov. 7, 1978

[54] ANIMAL HANDLING MEANS

[75] Inventor: William B. Whiteley, Orange, Australia

[73] Assignee: Marie Ellen Whiteley, New South Wales, Australia

[21] Appl. No.: 736,858

[22] Filed: Oct. 29, 1976

[30] Foreign Application Priority Data

Nov. 7, 1975 [AU] Australia .............................. 3882/75

[51] Int. Cl.² .............................................. A61D 3/00
[52] U.S. Cl. ................................................... 119/103
[58] Field of Search ...................... 119/96, 98, 99, 103

[56] References Cited

FOREIGN PATENT DOCUMENTS 220,868  4/1959  Australia .................................. 119/103
232,041  1/1961  Australia .................................. 119/103

Primary Examiner—Louis G. Mancene
Assistant Examiner—Robert P. Swiatek
Attorney, Agent, or Firm—J. Harold Nissen

[57] ABSTRACT

A device for raising sheep from a standing position to a higher inverted or semi-inverted position for performance of operations such as crutching or mulesing. The device comprises an upright race shaped portion having a pair of fixed sides and front and rear gates. The rear gate is openable to admit a sheep to the device whereafter it is closed. A member disposed on or adjacent the floor of the race has a bar located so that the front feet of the standing animal are forward and the rear feet behind this bar. This bar is attached to the rear gate and the rear gate is levered in a forward arc to cradle the rear of the animal and the bar lifted at the same time to raise the animal and to invert it to a prone position with its back cradle by the rotated rear gate, the animal being held to the gate by the raised bar.

10 Claims, 3 Drawing Figures

ANIMAL HANDLING MEANS

This invention relates to apparatus for handling animals and in particular to apparatus for handling farm animals including sheep and cattle. The apparatus is not restricted to these two animals but it is particularly suitable for and will be described in connection with the handling of sheep.

Various handling problems are associated with the treatment of sheep. These animals must be held on their backs for considerable periods of time for shearing and other purposes such as crutching and mulesing and attending to the animals' feet. For all these operations it is desirable that the sheep can be handled and held mechanically leaving the operator or operators to perform other duties unhindered by the difficult task of holding the sheep in a particular position.

Recent developments in shearing methods include a technique whereby the sheep is freely suspended by its legs from an overhead moving carriage which can move past several shearing locations. This method presents problems in getting the sheep to a position where its legs can be attached to the carriage. This position requires the sheep to be positioned horizontally on its back several feet above the ground. On the other hand for crutching and the like the sheep is preferably tilted backwards at about an angle of 45° at about say table height.

It is an object of this invention to provide sheep handling apparatus which is capable of positioning and holding the sheep in both the tilted and horizontal positions mentioned above.

In one broad form this invention provides animal handling apparatus comprising a frame into which an animal may be led or driven; means at the forward end of the frame to prevent escape of the animal therefrom; gate means at the rear end of said frame adapted to open to allow entry of an animal to said apparatus and to close behind such animal after entry thereto; lifting means disposed adjacent the floor of said apparatus and adapted to be raised beneath an animal so as to engage the animal's underbody adjacent and rearwardly of the front legs and also to engage the animal behind the upper portion of its rear legs so as to both raise the animal from the ground and pivot it about its rear portion; and cradle means adapted to cradle the animal's back during lifting and eventually at a predetermined orientation in which said animal is held between said lifting means and said cradle.

By way of example only one embodiment of apparatus according to this invention will now be described with reference to the accompanying drawings in which.

Figure 1:
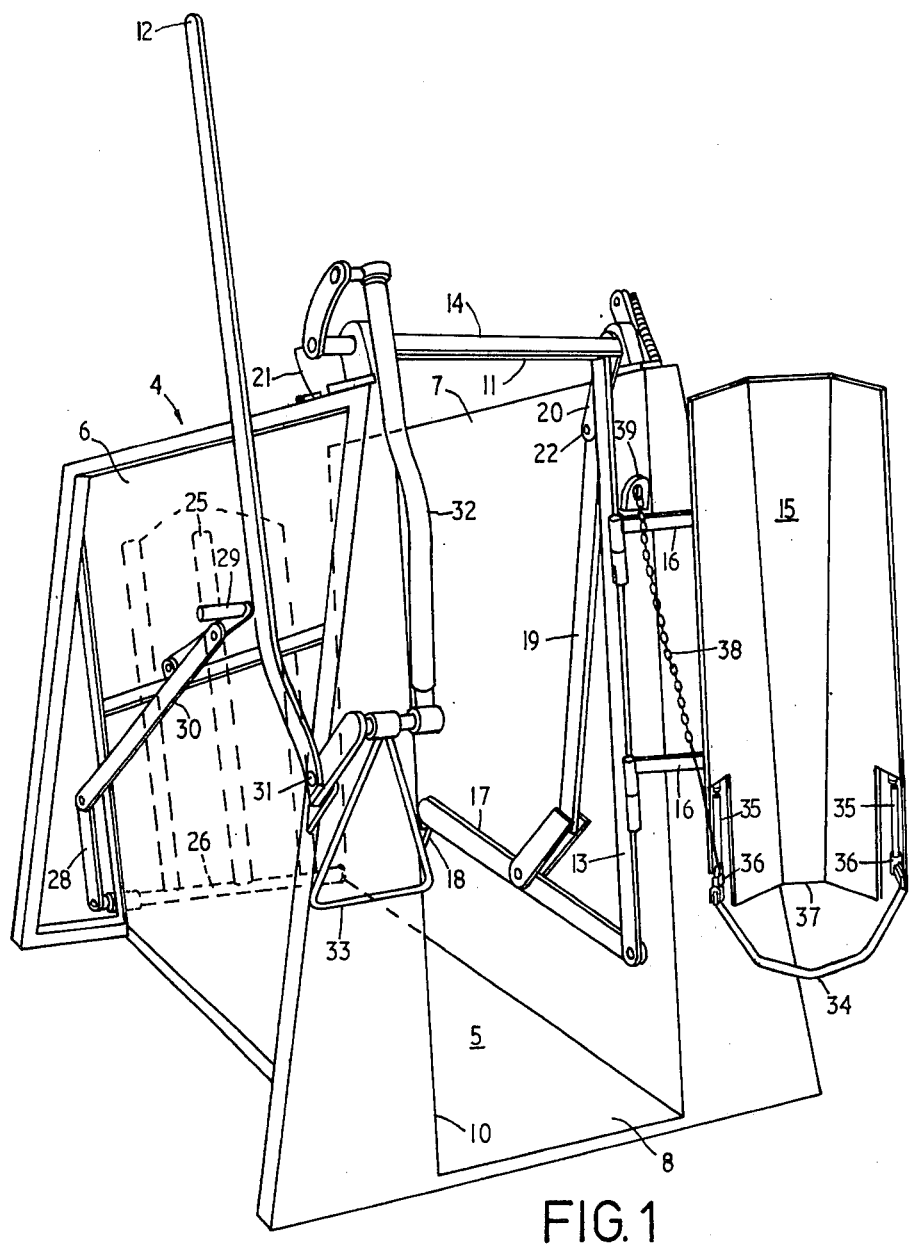
FIG. 1 is a perspective view of the apparatus showing the access door open.

The apparatus comprises a support frame 4 defining the animal race 5 and comprising side walls 6 and 7 and a floor 8. The side walls 6 and 7 are positioned just wide enough for a sheep 9 to pass down the race 5. Rotatably attached near the top of the race entrance 10 is a pivot bar 11 to which is attached a hand-operator lever 12. Between the side walls there are fixedly attached to the pivot bar 11 two cradle support arms 13 and 13A which are rotatable with the pivot bar 11 when this bar is rotated by the lever 12. In the inoperative position shown in FIGS. 1 and 2 the cradle support arms 13 and 13A hang more or less vertically downward parallel to the entrance 10. The cradle arms 13 and 13A are joined together by a bar 14 which runs parallel to the bar 11. An adjustable cradle/gate 15 is hinged to one of the cradle arms 13 and detachably latched to the other arm 13A. Hence in the inoperative or vertical position described above when the gate 15 is opened as in FIG. 1 the sheep 9 can walk into the race 5 between the cradle arms 13 and 13A. The cradle/gate 15 is normally attached to the cradle arm 13 by hinges 16.

Pivotally attached at or near the end of the cradle arms 13 and 13A are brisket bar support arms 17. These are joined at their outer end by the brisket bar 18. Along the length of the brisket bar support arms 17 are pivotally attached radius arms 19 which are pivotally attached at 22 at their other ends to brackets 20 and 21. These pivot points 22 on the brackets 20 and 21 are usually below and behind the pivot bar 11 of the cradle arms 13 and 13A.

Figure 2:
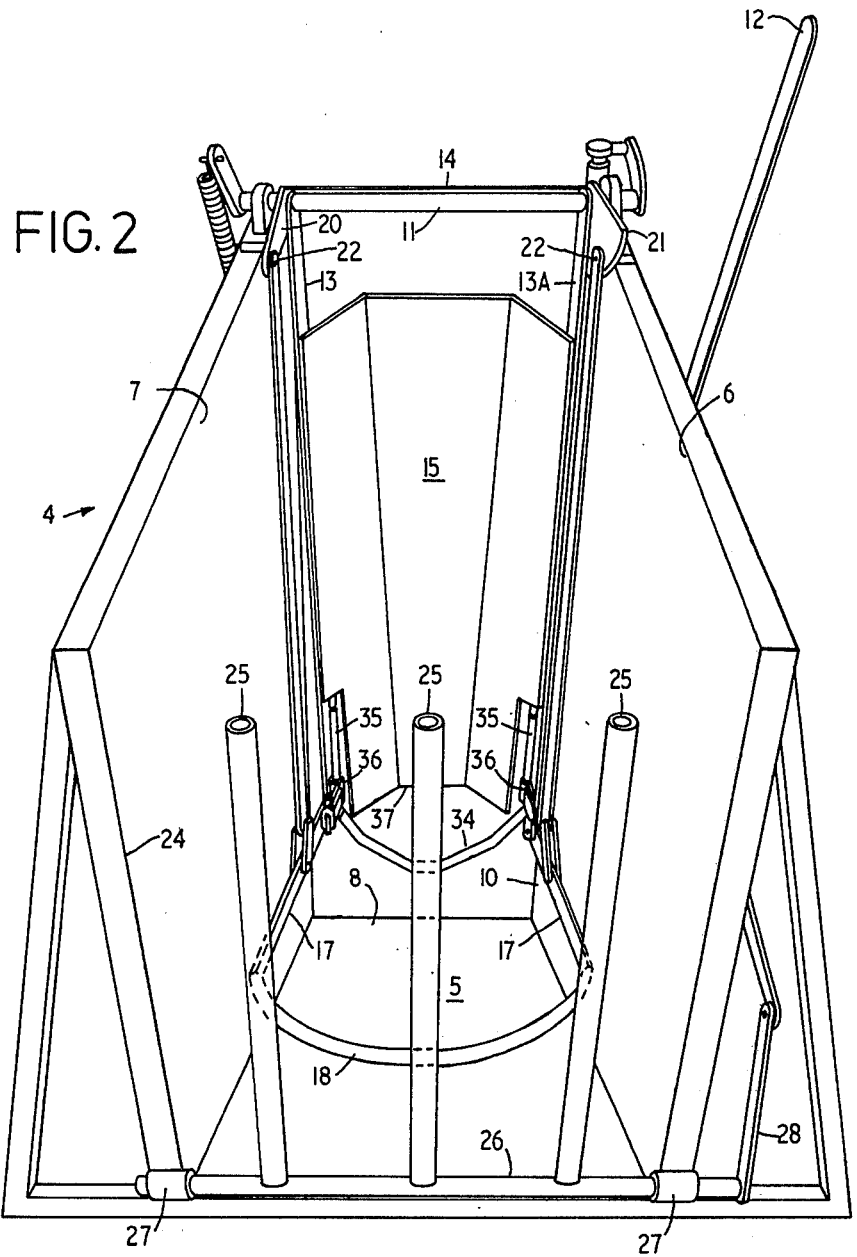
FIG. 2 is a perspective view of the opposite end of the apparatus to that shown in FIG. 1 with the access door closed.

In the inoperative position as shown in FIGS. 1 and 2 the brisket bar support arms 17 are more or less parallel to the floor 8. Hence when the gate 15 is open the sheep can walk into the race 5 and over the brisket bar 18 with just the front legs 23, the front end 24 of the race being blocked by three vertical posts 25.

The bars 25 are radially secured to a bar 26 rotatably mounted in bearings 27 located at floor 8 level. A crank arm 28 secured to the bar 26 is linked to an operating lever 29 by a link bar 30. The operating lever 29 is pivotally secured to the side wall 6 and can be swung over to raise or lower the bars 25.

The operating lever 12 is pivoted at 31 to the side wall 6 and actuates the pivot bar 11 by means of a link 32. A foot stirrup 33 is also provided to enable the operator to apply more torque to the bar 11. Alternatively a power actuated hydraulic cylinder (not shown) can be used to rotate the bar 11.

The gate 15 is now closed and latched behind the sheep 9 within the race 5 and standing on the floor 8. A "U" shaped hock bar 34 is mounted at the lower end of the gate 15 in the following manner. Two slide bars 35 extend downwardly and carry sleeves 36 to which the ends of the hock bar 34 are secured. The said hock bar can thus be moved with respect to the bottom edge 37 of the gate 15. A chain 38 is secured to the hock bar and the free end of said chain can be reefed into an anchor bracket 39.

With the sheep 9 in this position the operator pulls on the lever 12 to rotate the cradle support arms 13 and 13A forward and upward. The hock bar 34 catches the sheep 9 behind the upper rear legs 40 and lifts it forward and upward. At the same time the radius arms 19 connected to the brisket bar support arms 17 pivot these arms 17 about their joining points 41 to the cradle arms 13 and 13A. Hence as the cradle arms and hock bar 34 lift the sheep 9 forward and upward the brisket bar 18 on the brisket bar support arms 17 forces the sheep backwards onto the cradle 15 where it is supported on its back as shown in FIG. 3.

The length of the radius arms 19 can be adjusted as can the position of the pivot point between the cradle arms 13 and 13A and the brisket bar support arms 17. By altering one or both of these pivotal arrangements the brisket bar 18 can be arranged to reach its completely closed position, i.e. maximum retention of the sheep, at various positions of the cradle 15. Hence for crutching etc., the brisket bar 18 is completely closed and the sheep positively held when the cradle 15 is about ¾ of the way to its horizontal position. For completely inverting the sheep 9 to enable its attachment for chain shearing the brisket bar 18 does not reach its completely closed position until the cradle 15 is horizontal. The brisket bar 18 can be made adjustable or removable so that it could be moved from on top of the sheep 9 so that the sheep can be lifted off the cradle 15 by a conveyor (not shown).

Figure 3:
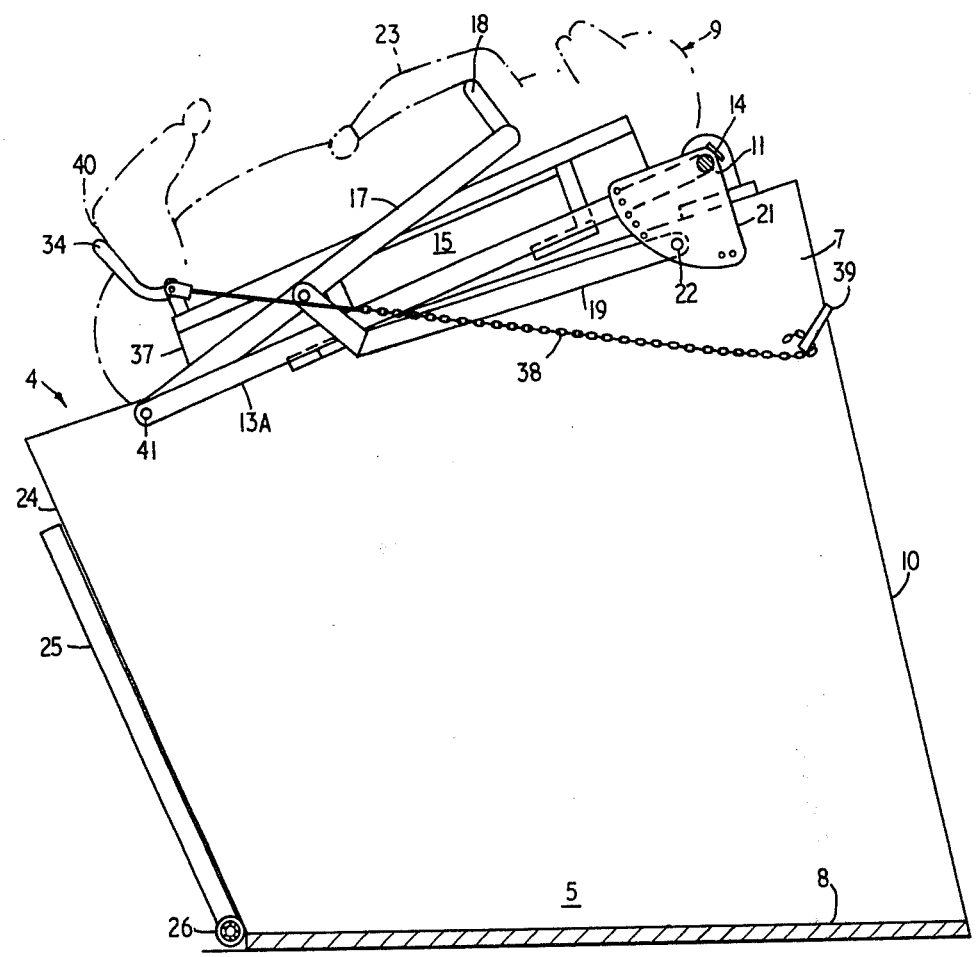
FIG. 3 is an elevation in section showing the cradle raised with an animal secured therein.

With the sheep 9 in the raised position as shown in FIG. 3 or any other intermediate position the chain 38 can be pulled by the operator to draw the hock bar 34 towards the brisket bar 18 or the chain may be preset to pull the hock bar 34 towards the brisket bar 18 without further adjustment or handling by the operator. The chain is then in a locked position in the anchorage 39 so as to hold the sheep 9.

The three vertical posts 25 which close off the front end 24 of the race 5 can be moved to form a ramp to enable the sheep 9 to more easily move off the cradle and out of the front 24 of the race 5 when the sheep 9 is disengaged from the apparatus.

Various refinements will be obvious to anyone skilled in the art. For instance, the apparatus may be hydraulically or otherwise powered. Also the cradle/gate 15 may be made slidable with respect to the cradle support arms 13 and 13A to provide greater freedom of movement in relation to the three upright retaining posts 25.

It is reiterated that the apparatus particularly described is only a preferred embodiment of the inventive concept disclosed. Variations may be made to that apparatus without departing from the scope of the invention which includes every novel feature and all novel combinations of features disclosed herein.

What I claim is:

1. Animal handling apparatus comprising a pair of spaced side walls defining between them an animal race;
   means at the forward end of said race to prevent escape of an animal therefrom;
   a first pair of spaced parallel support arms pivoted at or adjacent their upper ends to or adjacent the upper rear ends of respective said walls;
   a cradle-gate means hinged to one of said support arms and adapted to operate as a gate to allow entry of an animal to said race;
   means for detachably securing said cradle-gate means to the other of said support arms;
   a second pair of spaced parallel support arms one end of each thereof pivoted to respective lower ends of said first support arms;
   a brisket bar joining said second support arms adjacent respective other ends thereof;
   means for rotating said first support arms about their pivot and further means for pivoting said second support arms relative to said first support arms.

2. Apparatus as defined in claim 1 further comprising a pivot bar joining said first support arms at or near their upper extremities and adapted to rotate therewith.

3. Apparatus as defined in claim 2 further comprising a hock bar pivotably attached at or near the lower extremity of said cradle-gate means and adapted to engage the animal to impart thereto a forward and upward movement when said first pair of parallel support arms is rotated.

4. Animal handling apparatus as defined in claim 3 further comprising a pair of radius arms, each of said radius arms joining respective arms of said second pair of parallel arms to one of a pair of brackets fixed to said pivot bar and wherein said radius arms are pivoted both to said brackets and to link members in turn pivoted to said respective second parallel arms.

5. Apparatus as defined in claim 4 wherein said hock bar is movable relative to the bottom edge of said cradle-gate means.

6. Apparatus as defined in claim 4 wherein a chain is secured to said hock bar, the free end of said chain being reefed to a bracket on the entry end portion of said race.

7. Apparatus as defined in claim 5 wherein said radius arms are adjustable in length and wherein the pivot points between said first and second parallel arm pairs are also adjustable.

8. Apparatus as defined in claim 3 wherein said hock bar is removable from said cradle-gate means when said cradle-gate means is in a substantially horizontal orientation.

9. Apparatus as defined in claim 1 wherein said cradle-gate means is hydraulically rotatable.

10. Apparatus as defined in claim 1 wherein the means at the forward end of the race comprises a plurality of post members rotatable about a common axis to open the front end of the race to allow exit of the animal therefrom when desired.

* * * * *